Patented Dec. 15, 1942

2,305,558

UNITED STATES PATENT OFFICE 2,305,558

UNSATURATED KETO ESTERS AS INSECTICIDES

Richard O. Roblin, Jr., and William Moore, Stamford, Conn., assignors to American Cyanamid Company, New York, N. Y., a corporation of Maine No Drawing. Application April 9, 1940,
Serial No. 328,692

9 Claims. (Cl. 167—22)

The present invention relates to insecticides and more particularly to a class of compounds which are especially effective as contact poisons for the control of insect pests.

The invention is based upon the discovery that unsaturated keto esters of the general formula:

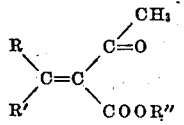

in which R is selected from the class consisting of hydrogen, aliphatic and aromatic radicals, R' is selected from the class consisting of hydrogen, aliphatic, substituted aliphatic, aromatic, substituted aromatic and aralkyl radicals, and R'' is an aliphatic hydrocarbon radical, possess high insecticidal activity against insects which are particularly difficult to exterminate, for example, the red spider, and that such activity is attained without any substantial harmful or detrimental action on the vegetation infested with the insect.

These unsaturated keto esters are condensation products resulting from the reaction of a ketone or an aldehyde with an alkyl ester of acetoacetic acid, for example, the reaction of benzaldehyde with ethylacetoacetate to form benzalethylacetoacetate may be represented by the equation:

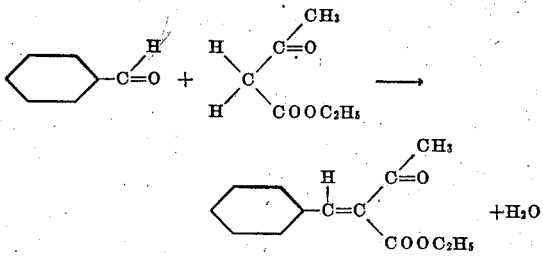

The following examples illustrate in detail the preparation of representative compounds of the invention. Materials employed are in parts by weight.

EXAMPLE 1

25 parts of benzaldehyde and 50 parts of 2-ethylhexylacetoacetate were mixed together and cooled to —15° C. 2 parts of piperidine were added as a catalyst. The mixture was allowed to stand for 48 hours at 5°–10° C. Water had separated at the end of this period. The mixture was then dissolved in ether, washed neutral with 0.05% sulphuric acid, dried over sodium sulphate and distilled. The benzal-2-ethylhexylacetoacetate was recovered as a slightly green viscous oil, boiling at 167° C. at a pressure of 1 mm.

EXAMPLE 2

30 parts of benzaldehyde and 75 parts of laurylacetoacetate were mixed together, cooled to 0° C. and treated with 2 parts of piperidine. The mixture was held at 5°–10° C. for 12 hours, then allowed to stand 24 hours at room temperature, after which it was treated according to the procedure followed in Example 1. The benzallaurylacetoacetate was recovered as a yellow-green oil, boiling at 170° C. at 0.4 mm. pressure.

EXAMPLE 3

17.5 parts of benzaldehyde and 50 parts of tetradecylacetoacetate were mixed together, cooled to 0° C. and treated with 2 parts of piperidine. The mixture was held at 5°–10° C. for 12 hours, then allowed to stand 48 hours at room temperature after which it was treated according to the procedure followed in Example 1. The benzaltetradecylacetoacetate was recovered as a yellow-green oil, boiling at 160° C. at 0.4 mm. pressure.

EXAMPLE 4

A mixture of 20 parts of α-n-amyl cinnamic aldehyde, 13 parts of ethylacetoacetate and 1 part of piperidine was allowed to stand at room temperature for 24 hours. Considerable water had separated at the end of this period. The reaction product was treated according to the procedure followed in Example 1. The α-n-amylcinnamalethylacetoacetate was recovered as a slightly yellow oil, boiling at 182° C. at less than 1 mm. pressure.

EXAMPLE 5

To a solution of .2 part of metallic sodium dissolved in 5 parts of alcohol were added 8 parts of ethylacetoacetate, 11.5 parts of cinnamalacetophenone and 60 parts of ether. The mixture was allowed to stand for 12 hours at room temperature, after which time the cinnamalacetophenone-ethylacetoacetate separated from the solution as a colorless crystalline solid. After recrystallization from alcohol the product melted at 106° C.

EXAMPLE 6

A mixture of 40 parts of heptaldehyde, 45 parts of ethylacetoacetate and 3 parts of piperidine was allowed to stand at —10° C. for 40 hours. The reaction product was treated according to the procedure followed in Example 1. The heptylideneethylacetoacetate was recovered as a colorless oil, boiling at 170°–180° C. at 1 mm. pressure.

EXAMPLE 7

70 parts of ortho-chlorobenzaldehyde and 65 parts of ethylacetoacetate were mixed together and cooled to −15° C. 1 part of piperidine was added during the course of one hour. The mixture was kept at −15° C. for 48 hours, then held at 5°–10° C. for 24 hours, after which it was treated according to the procedure followed in Example 1. The o-chlorobenzalethylacetoacetate was recovered as a colorless liquid boiling at 142° C. at less than 1 mm. pressure.

EXAMPLE 8

A mixture of 50 parts of chloral, 44 parts of ethylacetoacetate and 35 parts of acetic anhydride was placed in a suitable vessel and heated under a reflux condenser for 6 hours in an oil bath. The temperature of the bath was 125° C. The reaction mixture was cooled to 0° C., neutralized with sodium hydroxide, dissolved in ether and washed with water. The ether extract was dried over sodium sulphate, and the residue, after removal of the ether, was distilled under reduced pressure. The chlorylidene-ethylacetoacetate was recovered as a colorless liquid, boiling at 110°–115° C. at less than 1 mm. pressure.

The compounds of the present invention are characterized by increased toxicity in comparison with the simple alkyl esters of acetoacetic acid. Thus, with the compounds incorporated in a spray in which the solvent medium is a liquid consisting of 65% acetone and 35% water, the figures in the following tables represent the kills under comparable conditions at various dilutions when applied to the citrus red spider:

*Table 1*

| Compound | Dilution | Kill |
|---|---|---|
| | | Per cent |
| Ethylacetoacetate | 1– 500 | 0 |
| Butylacetoacetate | 1– 500 | 37.3 |
| 2-ethylhexylacetoacetate | 1– 500 | 100 |
| Do | 1–1000 | 74.6 |
| Laurylacetoacetate | 1– 500 | 100 |
| Do | 1–1000 | 84.1 |
| Do | 1–2000 | 77.5 |
| Tetradecylacetoacetate | 1–1000 | 100 |
| Do | 1–2000 | 93.3 |
| Do | 1–4000 | 56.8 |

*Table 2*

| Compound | Dilution | Kill |
|---|---|---|
| | | Per cent |
| Benzalethylacetoacetate | 1– 500 | 100 |
| Do | 1–1000 | 94.2 |
| Benzalbutylacetoacetate | 1–2000 | 100 |
| Do | 1–4000 | 69.5 |
| Benzal-2-ethylhexylacetoacetate | ¹ 1–1000 | 100 |
| Do | 1–2000 | 100 |
| Do | 1–4000 | 94.1 |
| Benzallaurylacetoacetate | ¹ 1–1000 | 100 |
| Do | 1–2000 | 94.3 |
| Benzaltetradecylacetoacetate | ¹ 1–2000 | 100 |
| Do | 1–4000 | 94.4 |
| Do | 1–8000 | 90.0 |

¹ A 100 per cent kill of the red spider eggs is obtained in conjunction with the 100 per cent kill of the active forms.

It is believed that the benzal-2-ethylhexylacetoacetate, benzallaurylacetoacetate and benzaltetradecylacetoacetate are new compounds. As shown above in Table 2, these substances are especially active insecticides for use against the red spider in that they destroy both the active forms and the eggs in one operation.

In regard to other compounds of the present invention, the following have been prepared and tested as to their killing power on red spiders, and are given in their decreasing order of toxicity: citrylidene ethylacetoacetate, 1-naphthalethylacetoacetate, o-chlorobenzalethylacetoacetate, α-n-amylcinnamalethylacetoacetate, p-chlorobenzalethylacetoacetate, furfuralethylacetoacetate, cinnamalethylacetoacetate, chlorylidene ethylacetoacetate, heptylidene ethylacetoacetate, crotylidene ethylacetoacetate, m-nitrobenzalethylacetoacetate, ethylidene ethylacetoacetate, cinnamalacetophenone ethylacetoacetate, methylene ethylacetoacetate, vanillalethylacetoacetate, isobutylidene ethylacetoacetate, and isopropylidene ethylacetoacetate.

These new insecticides may be applied in any of the conventional manners. Thus, for example, they may be incorporated in liquids for spraying purposes, or they may be effectively used in dusts with such inert solid diluents as kieselguhr, wood flour, walnut shell, talc and the like.

While the invention has been described with particular reference to specific embodiments, it is to be understood that it is not to be limited thereto but is to be construed broadly and restricted solely by the scope of the appended claims.

We claim:

1. An insecticide containing a toxic amount of a compound of the general formula:

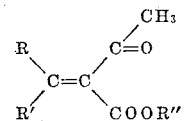

in which R is selected from the class consisting of hydrogen, aliphatic and aromatic radicals, R' is selected from the class consisting of hydrogen, aliphatic, substituted aliphatic, aromatic, substituted aromatic and aralkyl radicals, and R'' is an aliphatic hydrocarbon radical.

2. An insecticide containing a toxic amount of a compound of the general formula:

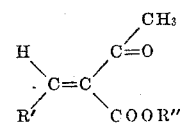

in which R' is selected from the class consisting of hydrogen, aliphatic, substituted aliphatic, aromatic, substituted aromatic and aralkyl radicals, and R'' is an aliphatic hydrocarbon radical.

3. An insecticide containing a toxic amount of a compound of the general formula:

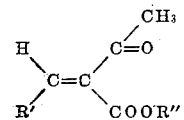

in which R' is an aromatic radical, and R'' is an aliphatic hydrocarbon radical.

4. An insecticidal composition including a toxic amount of benzal-2-ethylhexylacetoacetate.

5. An insecticidal composition including a toxic amount of benzallaurylacetoacetate.

6. An insecticidal composition including a toxic amount of benzaltetradecylacetoacetate.

7. Benzal-2-ethylhexylacetoacetate.

8. Benzallaurylacetoacetate.

9. Benzaltetradecylaceoacetate.

RICHARD O. ROBLIN, Jr.
WILLIAM MOORE.